(12) United States Patent
Virnig

(10) Patent No.: US 7,993,613 B2
(45) Date of Patent: Aug. 9, 2011

(54) MORE EFFICIENT ETHER MODIFIERS FOR COPPER EXTRACTANT FORMULATIONS

(75) Inventor: Michael Virnig, Tucson, AZ (US)

(73) Assignee: Cognis IP Management GmbH, Duesseldorf (DE)

( * ) Notice: Subject to any disclaimer, the term of this patent is extended or adjusted under 35 U.S.C. 154(b) by 463 days.

(21) Appl. No.: 11/946,961

(22) Filed: Nov. 29, 2007

(65) Prior Publication Data

US 2008/0175772 A1 Jul. 24, 2008

Related U.S. Application Data

(60) Provisional application No. 60/871,152, filed on Dec. 21, 2006.

(51) Int. Cl.
*B01D 11/00* (2006.01)

(52) U.S. Cl. ............. 423/24; 423/23; 252/364; 252/184

(58) Field of Classification Search .............. 423/24, 423/23; 252/184, 364
See application file for complete search history.

(56) References Cited

U.S. PATENT DOCUMENTS

| | | | |
|---|---|---|---|
| 4,507,268 A | 3/1985 | Kordosky et al. | |
| 4,978,788 A | 12/1990 | Dalton et al. | |
| 5,176,843 A | 1/1993 | Dalton et al. | |
| 5,281,336 A | 1/1994 | Dalton et al. | |
| 6,113,804 A | 9/2000 | Dalton et al. | |
| 6,177,055 B1 | 1/2001 | Virnig et al. | |

(Continued)

FOREIGN PATENT DOCUMENTS

WO 99/10546 3/1999

(Continued)

OTHER PUBLICATIONS

A. M. Sastre et al. "Discussion of the Physiochemical Effects of Modifiers on the Extraction Properties of Hydroxyoximes. A Review" Solvent Extraction and Ion Exchange, vol. 22, Issue 5, Dec. 2004, pp. 737-759.

(Continued)

*Primary Examiner* — Jerry Lorengo
*Assistant Examiner* — Pritesh Darji
(74) *Attorney, Agent, or Firm* — Diehl Servilla LLC

(57) ABSTRACT

The disclosed invention provides water-insoluble, water-immiscible extraction reagent compositions comprising an extractant reagent comprising one or more aldoxime extractants, optionally including one or more ketoxime extractants, in combination with one or more ether or polyether equilibrium modifiers, or mixtures thereof, selected from the compounds of Formula I-III:

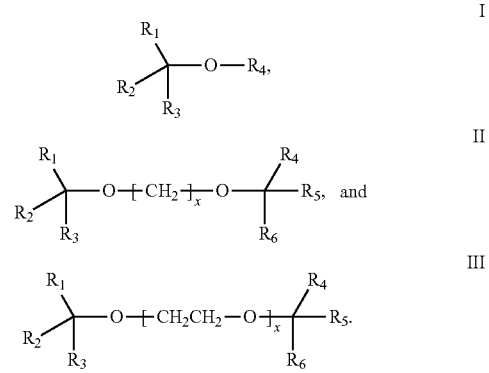

7 Claims, 1 Drawing Sheet

U.S. PATENT DOCUMENTS

| | | | |
|---|---|---|---|
| 6,231,784 B1 | 5/2001 | Virnig et al. | |
| 6,277,300 B1 | 8/2001 | Dalton et al. | |
| 2002/0157572 A1* | 10/2002 | Sudderth et al. | 106/311 |
| 2006/0192175 A1* | 8/2006 | Sudderth et al. | 252/184 |

FOREIGN PATENT DOCUMENTS

WO     2006104816 A1    10/2006

OTHER PUBLICATIONS

G. Kordosky & M. Virnig Equilibrium Modifiers in Copper Solvent Extraction Reagents—Friend or Foe? Hydrometallurgy 2003, TMS 2003, pp. 905-916.
International Search Report from PCT/US2007/024738.
European Search Report.

* cited by examiner

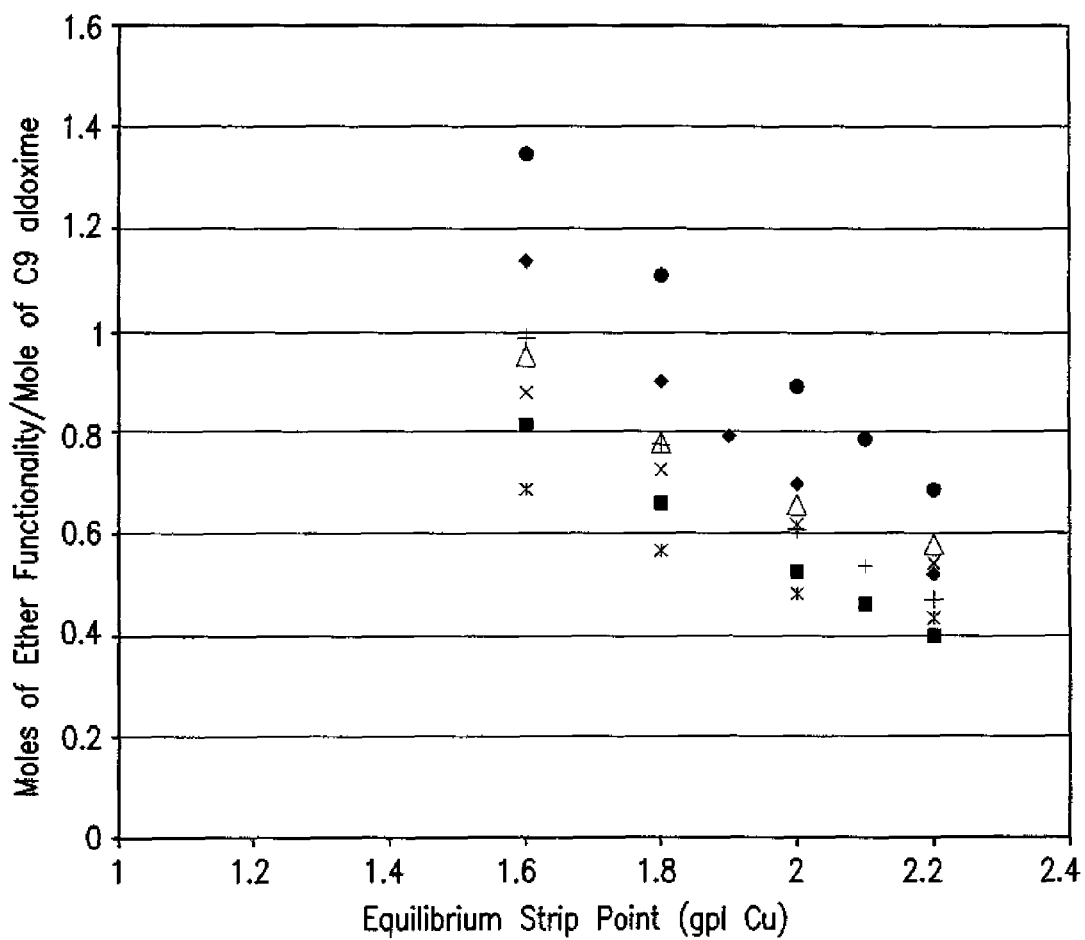

MORE EFFICIENT ETHER MODIFIERS FOR COPPER EXTRACTANT FORMULATIONS

CROSS-REFERENCE TO RELATED APPLICATION

This Application claims the benefit, under 35 USC §119, of U.S. Provisional Application Ser. No. 60/871,152, filed Dec. 21, 2006, the entire contents of which are incorporated herein by reference.

BACKGROUND OF THE INVENTION

1. Technical Field

This invention is directed to novel equilibrium modifiers for use with oxime extractant reagents in water-immiscible hydrocarbon solvent formulations for the recovery of copper from acidic leach solutions containing copper values and other metal ions.

2. Background and Related Art

The starting material for large-scale solvent exaction processing of copper is an aqueous leach solution—usually a sulfuric acid solution, but it may also be a basic aqueous solution when ammonia is the leaching agent—that is distributed over mined ore containing a mixture of metals in addition to copper, dissolving salts of copper and other metals as the leach solution trickles through that ore.

The aqueous leach solution with its resulting mixture of metal values is then mixed in mixer tanks with a water-immiscible liquid hydrocarbon solvent (e.g., kerosene) containing one or more extractant chemicals (e.g., oximes), possibly including one or more equilibrium modifiers, that selectively forms a metal-extractant complex or chelate with the copper ions/values in preference to ions of other metals, in a step called the extraction or loading stage of the solvent extraction process. The outlet of such tanks continuously feeds to a large settling tank, where the organic solvent (organic phase), now containing the copper-extractant complex in solution, is separated from the copper-depleted aqueous solution (aqueous phase) in a phase separation stage, a step that may be complicated by the presence of such one or more equilibrium modifiers, which hinder phase separation and/or may cause the build-up of crud at the boundary of the phases. At the higher concentrations of modifier(s) in the extractant formulation, the modifier contributes significantly to the viscosity of the overall reagent formulation, and therefore, being able to use less modifier component is an advantage simply because the overall viscosity of the organic phase is also lower—a particularly important advantage in the phase separation stages.

After extraction and phase separation, the metal-depleted aqueous feedstock (raffinate) is either discharged or recirculated to the ore body for further leaching. The loaded organic phase, now pregnant with the dissolved copper-extractant complex is fed, possibly after a washing stage to facilitate removal of undesired amounts of iron and other metal ions, to a stripping stage, comprising another set of mixer tanks, where it is mixed with an aqueous sulfuric acid strip solution. This strip solution breaks apart the copper-extractant complex and permits the extracted copper to pass to another settler tank for another phase separation, where, again, equilibrium modifiers may cause inefficient phase separation and undesired entrainment of the organic phase in the resulting strip aqueous phase. On the other hand, however, adding a limited quantity of one or more equilibrium modifiers to the extractant formulation shifts the equilibria in such a manner that one can efficiently strip higher amounts of copper from the extractant using conventional stripping solutions, generating a more copper-rich electrolyte, well suited for the electrodeposition of high purity copper.

From the stripping settler MA, the "regenerated" organic phase, effectively stripped of its metal values, is recycled to the extraction mixers to begin extraction again, and the copper-rich strip aqueous phase is customarily fed to an electrowinning tankhouse, where the copper metal values are collected on plates by a process of electrodeposition. Then, after electrowinning to harvest the copper values from the aqueous solution, the copper-depleted solution, known as spent electrolyte, is returned to the stripping mixers to begin stripping again.

Modifiers of extraction and stripping equilibria are frequently incorporated in the commercial reagent formulations, when such formulations include the so-called "strong" extractants, e.g., the aldoximes. Such extractants are capable of forming a very stable complex association with copper at quite low pH's and, consequently, require the use of very highly acidic aqueous stripping solutions in order to effect the breakdown of the copper-extractant complex. The resultant copper-rich aqueous strip solution, however, is not suitable for the electrowinning of high purity copper metal due to the high acid concentration and the relatively low copper concentration. The solubility of copper sulfate is depressed at high sulfuric acid concentrations.

The use of modified aldoximes (i.e., an aldoxime extractant plus an equilibrium modifier) to extract copper from aqueous acidic sulfate solutions is well known. ICI introduced P5100, 5-nonylsalicylaldoxime (NSO) modified by nonylphenol (NP), to the industry in the early 80's, then Henkel introduced LIX 622, a mixture of isotridecyl alcohol (TDA) with 5-dodecylsalicylaldoxime, and LIX 622N, TDA in combination with NSO. U.S. Pat. Nos. 4,978,788; 5,176,843; 5,281,336; 6,113, 804; and 6,277,300 (all, Dalton et al) describe formulations based on the use of highly-branched alcohols and esters, such as 2,2,4-trimethyl-1,3-pentanediol di-isobutyrate (TXIB), as modifiers. U.S. Pat. No. 6,177,055 B1 (Virnig et al) discloses the use of linear esters, such as di-n-butyl adipate (DBA), as modifiers. U.S. Pat. No. 6,231,784 B1 ('784, Virnig et al) discloses a very broad range of chemical classes, including simple carboxylic acid esters, oximes, nitriles, ketones, amides (carboxamides, sulfonamides and/or phosphoramides), carbonates, carbamates, sulfoxides, ureas, phosphine oxides, alcohols, ester ethers, polyethers and mixtures thereof, that can be used in combination with the NSO aldoxime to formulate copper solvent extraction reagents.

Two articles providing analysis of the effects of modified oxime exaction reagents on the extraction and recovery process are: "Discussion of the Physiochemical Effects of Modifiers on the Extraction Properties of hydroxyamines; A Review", A. M. Sastre and J. Szymanowski, Solvent Extraction and Ion Exchange, Vol. 22(5), pp 737-759 (2004); and "Equilibrium Modifiers in Copper Solvent Exaction Reagents—Friend or Foe?", G. Kordosky and M. Viring, Proceedings of Hydromet 2003, TMS, 2003.

The currently-used modifiers require fairly high modifier concentrations relative to the one or more aldoxime extractants in order to achieve the desired modifying effect. This increases the overall cost of the extractant/modifier reagent and increases the potential adverse effects of modifiers, such as increased viscosity in the organic phase and increased density of the organic phase, both of which contribute to poor phase separation and/or crud generation in the mixer/settlers. Accordingly, it was an object of the present invention to find equilibrium modifiers which deliver effective levels of modification at lower molar ratios of modifier-to-aldoxime extraction reagent(s).

Modifiers function by hydrogen bonding with the oxime. Thus, increasing the steric bulkiness around the functional group of the modifier(s) would be expected to make the functional group less available to form the necessary hydrogen bonding. Indeed, if one increases the steric bulk by introducing additional branching on both sides of the ether functionality, one will depress the overall effectiveness of the ether as a thermodynamic modifier. For these reasons, it was completely surprising that increasing steric bulkiness close to only one side of an ether oxygen atom had the opposite effect that is, of a lower ether modifier(s)-to-extractant reagent(s) ratio necessary to achieve the same level of modification, even as compared to ethers with no steric hindrance on either side of the ether oxygen functionality.

BRIEF SUMMARY OF THE INVENTION

Thus, it has been surprisingly discovered that new ether and polyether equilibrium modifiers, which are generally typified by having one or more branched alkyl chains on the first or second carbon from one side of the ether oxygen (or terminal ether oxygen in the case of polyethers). Optionally, in the ether equilibrium modifiers, minimal (preferably $C_1$-$C_4$) branching from the fourth or more distant carbon on the other side of the ether oxygen may also be present. Some of these new ether equilibrium modifiers have structural Formula I:

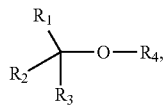

I wherein each of $R_1$, $R_2$, and $R_3$, independently, represents a saturated or unsaturated, straight- or branched-$C_1$-$C_6$-alkyl group, hydrogen, a $C_5$- or $C_6$-cycloalkyl group, or a phenyl group, preferably each is a saturated $C_1$-$C_6$-alkyl group, more preferably each is methyl; and $R_4$ represents a saturated or unsaturated, straight-chain $C_1$-$C_{20}$-alkyl group, preferably such as a $C_4$-$C_{14}$-alkyl group, and more preferably such as a $C_6$-$C_{14}$-alkyl group, with the proviso that, if one of $R_1$, $R_2$, and $R_3$ is hydrogen, the other two must be the same $C_1$-$C_6$-alkyl group or different $C_1$-$C_6$-alkyl groups, or one of the other two may be a $C_5$- or $C_6$-cycloalkyl group or a phenyl group, or $R_4$ may also represent a saturated or unsaturated, branched-chain $C_4$-$C_{20}$-alkyl group, where minimal (preferably $C_1$-$C_4$) branching on the alkyl group does not occur until on or after the fourth carbon from the ether functionality; and with the further proviso that the total number of carbon atoms in the structure is 8-24, preferably 9-20.

Some of these new polyether equilibrium modifiers have structural Formula II:

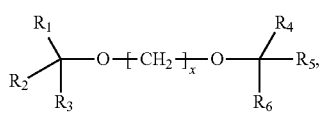

II wherein each of $R_1$, $R_2$, $R_3$, $R_4$, $R_5$ and $R_6$, independently, represent a saturated or unsaturated, straight or branched $C_1$-$C_6$-alkyl group, hydrogen, a $C_5$- or $C_6$-cycloalkyl group, or a phenyl group, preferably each is a saturated $C_1$-$C_6$-alkyl group, and more preferably methyl; and x is 2-12, preferably 2-4, more preferably 2:

with the proviso that at least two of $R_1$, $R_2$, and $R_3$, and at least one of $R_4$, $R_5$ and $R_6$ are other than hydrogen, and with the further proviso that the total number of carbon atoms in the structure is 10-24, and preferably 10-20.

And others of these polyether equilibrium modifiers have the structural Formula III:

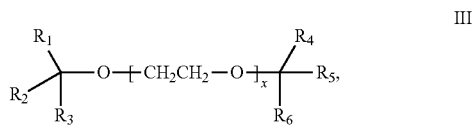

III wherein $R_1$, $R_2$, $R_3$, $R_4$, $R_5$ and $R_6$, independently, represent a saturated or unsaturated, straight- or branched-$C_1$-$C_6$-alkyl group, hydrogen, a $C_5$- or $C_6$-cycloalkyl group, or a phenyl group, preferably each is methyl; and x is 2-6, preferably 2-4, more preferably 2;

with the proviso that at least two of $R_1$, $R_2$, and $R_3$, and at least one of $R_4$, $R_5$ and $R_6$ are other than hydrogen, and with the further proviso that the total number of carbon atoms in the structure is 10-24, and preferably 10-16.

In another aspect, the invention provides extraction reagent compositions comprising a mixture of an extractant reagent comprising one or more aldoximes (and, optionally, one or more ketoximes) in combination with one or more ether equilibrium modifiers and/or one or more polyether equilibrium modifiers (thus including mixtures of one or more ether modifiers and one or more polyether modifiers), wherein these ether and polyether modifiers are selected from the compounds of Formulas I-III, and the combination of extractant reagent and modifier(s) is in a molar ratio of one or more such equilibrium modifiers-to-extractant reagent that is effective to provide a net copper transfer greater than that achieved in the absence of such modifier(s), preferably in a ratio of modifier(s)-to-extractant reagent of about 0.05 to about 1.5, more preferably about 0.1 to about 1.5, and most preferably about 0.2 to about 1.5.

In still another aspect, the invention provides a process for extracting copper ions/values from aqueous acidic leach solutions containing copper ions/values utilizing an extraction reagent composition comprising a mixture of one or more hydroxy aryl aldoxime extractants (with, optionally, one or more ketoxime extractant) and one or more ether equilibrium modifiers and/or one or more polyether equilibrium modifiers, wherein such modifier(s) is/are selected from the compounds of Formulas I-III above.

BRIEF DESCRIPTION OF THE DRAWING

FIG. 1 is a graph comparing the effect of particular branching on modifier strength for the branched-chain ether compounds of Formulas I and II of the invention.

DETAILED DESCRIPTION OF THE INVENTION

The terms "equilibrium modifier", "modifier" and "thermodynamic modifier" are used interchangeably herein to generally refer to additives according to the instant invention for an extractant reagent, which reagent comprises one or more aldoxime extractants, optionally with one or more ketoxime extractants, wherein the use of such a combination in the suggested ratios materially increases the net copper transfer from the extraction stage to the stripping stage in the organic phase.

In its first aspect, the present invention provides novel branched-chain ether equilibrium modifiers and branched-chain polyether equilibrium modifiers of Formulas I-III above.

In another aspect, the present invention provides extraction reagent compositions comprising a mixture of an extractant reagent, comprising one or more hydroxy aryl aldoxime extractants, optionally with one or more ketoxime extractants, in combination with one or more branched-chain ether equilibrium modifiers and/or one or more branched-chain polyether equilibrium modifiers, where such equilibrium modifiers) is/are selected from the compounds of Formulas I-III, above, in a molar ratio of equilibrium modifier(s)-to-extractant reagent adequate to provide a net copper transfer greater than that achieved by extraction with the aldoxime(s) or the combination of aldoxime(s) and ketoxime(s) alone, without the presence of the modifier(s). The inventive extraction reagent formulation may optionally include one or more known equilibrium modifiers in addition to the ethers and/or polyether equilibrium modifiers.

In a further aspect, the invention provides a process for extracting copper ions/values from aqueous acidic leach solutions containing copper ions/values, comprising:

(a) contacting the copper-containing aqueous solution with an organic phase comprising the water-immiscible liquid hydrocarbon solvent solution of an extraction reagent formulation comprising one or more aldoxime extraction reagents or a mixture of one or more aldoxime extraction reagents and one or more ketoxime extraction reagents and, in either case, one or more ether equilibrium modifiers and/or one or more polyether equilibrium modifiers selected from among those of Formulas I-III above, to extract at least a portion of the copper values from the aqueous solution (resulting in a largely copper-barren aqueous phase) into the organic phase (resulting in a copper-pregnant organic phase);

(b) separating the copper-pregnant organic phase from the copper-barren aqueous phase; and (c) recovering the copper values from the copper-pregnant organic phase.

U.S. Pat. No. 4,507,268 ('268, Kordosky et al) describes extraction reagents formulated with various oxime extractants, including hydroxyaryl aldoxime extractants, which are employed in water-immiscible organic solvents, such as kerosene, with certain equilibrium modifiers, such as phenols and alcohols (tridecanol, a commercially-available branched-chain alcohol) or tributyl phosphate. In defining the amount of modifier which would result in increased net copper transfer with the particular aldoxime(s) employed, more particularly exemplified by 2-hydroxy-5-nonylbenzaldoxime, the patentee developed a "degree of modification" test. As employed there and herein, "degree of modification" designates the inverse ratio of (a) the copper level still in the organic phase after snipping of an hydroxy aryl aldoxime extractant at equilibrium (expressed in terms of grams per liter of copper) extracted with an aqueous solution containing a fixed concentration of copper and sulfuric acid to (b) the copper level still in the organic phase after stripping of the same extractant under the same conditions when one or more selected equilibrium modifier additives is/are present. Consistent with this definition, the presence of relatively small quantities of one or more equilibrium modifiers will shift the exaction equilibrium slightly, resulting in minor diminution of aldoxime copper level still in the organic phase after stripping at equilibrium, as will be reflected by a degree of modification value closely approaching 1.0, e.g., 0.99. Increased effective quantities of modifier under otherwise identical conditions will result in a more pronounced shift in extraction equilibrium and a more pronounced diminution of copper level still in the stripped organic phase at equilibrium, as will be reflected by a degree of modification correspondingly less than 1.0.

Expectedly, the degree of modification resulting from a given molar ratio of equilibrium modifier(s)-to-extraction reagent will vary depending on various factors, most significantly, the chemical identity and nature of the equilibrium modifier(s). In the '268 patent, the test conditions for purposes of determining the degree of modification were to include a temperature of about 24° C. at which the determination is to be made, a molar concentration of aldoxime (or sum of the molar concentrations in a mixture of aldoximes) in the diluent (Escaid 100 or a mixture of aliphatic and aromatic hydrocarbons closely approximating the constitution of Escaid 100) of about 0.184, as determined by copper loading and titration, and an aldoxime stock of approximately 94 percent purity (with the remainder being substantially alkyl phenol starting material residue), and a strip solution of about 150 g/l sulfuric acid and 30 g/l $Cu^{+2}$. An atomic absorption methodology should be employed for determining copper content in the resulting strip aqueous and organic phases.

Aldoxime extractants with which the one or more modifiers of Formulas I-III of the present invention are particularly useful include those hydroxy aryl aldoximes of the Formula A:

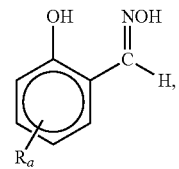

in which "a" is 1, 2, 3 or 4, R is a saturated aliphatic group of 1 to about 25 carbon atoms or an ethylenically-unsaturated aliphatic group of 3 to about 25 carbon atoms, and the total number of carbon atoms in $R_a$ is from 3 to about 25. Preferred compounds are those wherein "a" is 1, and R is a straight- or branched-chain alkyl group having from about 7 to about 12 carbon atoms, and is attached in a position para to the hydroxyl group. Among such aldoximes, the more preferred are those wherein R is a mixture of isomers. Compounds which are especially useful include 2-hydroxy-5-heptylbenzaldoxime, 2-hydroxy-5-octylbenzaldoxime, 2-hydroxy-5-nonylbenzaldoxime and 2-hydroxy-5-dodecylbenzaldoxime.

Ketoxime extractants that may be included in the extraction formulations with one or more aldoximes and one or more modifiers, selected from the compounds of Formulas I-III, include hydroxyl aryl ketoximes of Formula B:

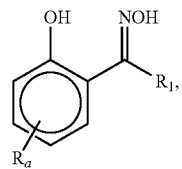

in which "a" is 1, 2, 3 or 4, R is a saturated aliphatic group of about 1 to about 25 carbon atoms or an ethylenically-unsaturated aliphatic group of 3 to about 25 carbon atoms, with the total number of carbon atoms in R being from 3 to about 25, and $R_1$ is a saturated aliphatic group from 1 to about 10 carbon atoms, with methyl, ethyl, propyl, and butyl being preferred. Preferred compounds are those wherein "a" is 1, and R is a straight- or branched-chain alkyl group having from about 7 to about 12 carbon atoms, and is attached in a position para to the hydroxyl group. Among such ketoximes, the more preferred are those wherein R is a mite of isomers. Such ketoximes of particular interest include 2-hydroxy-5-nonylacetophenone oxime, 2-hydroxy-5-dodecylacetophenone oxime, 2-hydroxy-5-nonylpropriophenone oxime, and 2-hydroxy-5-dodecylpropriophenone oxime.

A wide variety of essentially-water-immiscible, water-insoluble liquid hydrocarbon solvents may be used in the copper recovery process of the present invention. These include aliphatic and aromatic hydrocarbons, such as kerosene, benzene, toluene, xylene, and the like. A choice of essentially-water-immiscible liquid hydrocarbon solvents, or mixtures thereof, for commercial operations will depend on a number of factors, including the plant design of the solvent extraction plant (mixer-settler units, Podbielnak extractors, and the like). The preferred solvents for use in the recovery process of the present invention, are essentially-chemically-inert aliphatic and aromatic hydrocarbons having flash points of 130 degrees Fahrenheit and higher, and preferably at least 150° F., and solubilities in water of less than 0.1%, by weight. Representative commercially-available solvents are Chevron ion exchange solvent (available from Standard Oil of California, having a flash point 195° F.); Escaid 100 and 110 (available from Exxon-Europe, having a flash point of 180° F.); Norpar 12 (available from Exxon-USA, with a flash point of 160° F.); Conoco™-C1214 (available from Conoco, with a flash point of 160° F.); Aromatic 150 (an aromatic kerosene available from Exxon-USA, with a flash point of 150° F.); and other kerosene and petroleum fractions available from various oil companies.

In developing extractant formulations for the recovery of copper from leach liquors, it is advantageous to use the minimum amount of equilibrium modifier(s) required to give the desired effect. See "Equilibrium Modifiers in Copper Solvent Extraction Reagents—Friend or Foe?", op cit. It is also desirable to achieve the maximum amount of net transfer of copper on the extractant formulation, dependent on a combination of the extractive strength of the extractant formulation and the ease with which the copper may be stripped. An additional way to evaluate the effects of different levels of modifiers on the metallurgical performance of extractant formulations is to compare the relative measures of the equilibrated strip points of an organic solution of the extractant at a set copper max load, e.g., 5.6 gpl Cu, as determined by the Cognis QC procedure for oximes, which provides a measure of the active oxime content of the extractant. The equilibrated strip point is defined as the copper concentration on the organic phase (Cu max load=5.6 gpl Cu) that has been equilibrated with a 35 gpl copper as sulfate/160 gpl sulfuric acid solution. As with the degree of modification, comparison of the relative equilibrated strip points allows one to compare the relative extractive strengths of two extractant formulations. Formulations having identical copper max loads and identical equilibrated strip points will give essentially identical performance in terms of copper net transfer in a circuit, assuming all other factors, such as circuit configuration, aqueous feed solution, and strip solution, are identical.

EXAMPLES

The following Examples, Table and related information illustrate the practice and best mode of the invention, particularly showing differences between the inventive ether equilibrium modifiers of the invention and previously-known ether modifiers, but should not be interpreted as limiting the invention.

Example 1

Preparation of t-Butyl Ethers

The synthesis of the t-butyl ethers was carried out using the general procedure being used for the production of t-butyl n-octyl ether. n-Octyl alcohol (130 g) and AMBERLYST® 15 (10 g) (an ion exchange resin available from Rohm and Haas) were charged to a glass reaction vessel and heated to 50-60° C. with stirring, then isobutylene was fed to the reactor. The temperature was controlled at 55-65° C. by cooling and adjusting the rate of isobutylene addition. When the pressure was stable for 0.5 hour, the excess isobutylene was vented and the catalyst removed by filtration. A small amount of potassium carbonate was added to neutralize any residual acidity and the product was distilled under vacuum (165-185° C., 3040 mm of Hg).

Example 2

Comparison of Effectiveness of Branched-Chain Ether Modifiers

This experiment was carried out to compare the effectiveness of different ethers as modifiers.

A 0.36 M solution of 5-nonylsalicylaldoxime was prepared in SHELLSOL® D70, a petroleum distillate available from Shell Chemicals. 25 ml portions of this solution were measured into 50 ml volumetric flasks and varying amounts of the particular ether was added to each flask to give a range of from 0.1 g per 50 ml to 2 g per 50 ml over 8 to 10 points. The contents of each flask was then diluted to volume with SHELLSOL D70. At this point, the final diluted solution is equivalent to 10% (v/v) of a formulated reagent containing 1.8 M 5-nonylsalicylaldoxime and 20 to 400 gpl of the particular ether modifier.

Portions (20 ml) were then equilibrated with either Cognis QC feed solution (3+/−0.1 gpl Cu, 6+/−gpl $Fe^{+3}$, pH 2.0+/−0.05) to determine the maximum copper loading capacity, or Cognis QC strip solution (35 gpl Cu, 160 gpl sulfuric acid) to determine the equilibrated strip point by three contacts at an organic-to-aqueous volume ratio of 1/1. The organic phases were isolated, filtered through phase separation paper to remove any entrainment, and then analyzed by atomic absorption spectroscopy for copper content. The copper max load typically averaged between 5.5 gpl to 5.7 gpl.

The modifier concentration in terms of gpl in the formulated extractant was then plotted against the equilibrated strip point. Using Excel, a quadratic equation relating the modifier concentration in the formulated extractant-to-equilibrated strip point was determined from this plot. This equation was then used to calculate the modifier concentration at various selected equilibrated strip points. The resultant modifier concentrations was then converted into moles per liter of ether functionality, which was then divided by 1.8 moles per liter (the concentration of the 5-nonylsalicylaldoxime in the formulated extractant) to give the moles of ether functionality per mole of 5-nonylsalicylaldoxime in the formulated product. Plots of the ratio of the ether functionality-to-oxime versus the equilibrated snip point are summarized in FIG. 2 and in Table 1 below.

TABLE 1

Equilibrium Strip Point v. Molar Ratio of Branched-Chain Ethers

| 1,6-bis(t-butoxy)hexane | | 1,4-bis(t-butoxy)butane | | 1-t-Butoxy-2-n-butoxyethane | | t-Butyl n-octyl ether | |
|---|---|---|---|---|---|---|---|
| Mol Ratio | Eq Strip Pt | Mol Ratio | Eq Strip Pt | Mol Ratio | Eq Strip Pt | Mol Ratio | Eq Strip Pt |
| 0.44 | 2.2 | 0.55 | 2.2 | 0.58 | 2.2 | 0.40 | 2.2 |
| 0.49 | 2 | 0.62 | 2 | 0.66 | 2 | 0.46 | 2.1 |
| 0.57 | 1.8 | 0.73 | 1.8 | 0.79 | 1.8 | 0.53 | 2 |
| 0.69 | 1.6 | 0.88 | 1.6 | 0.96 | 1.6 | 0.67 | 1.8 |

| Di-n-octyl ether | | Di-n-hexyl ether | | t-Butyl 2-ethylhexyl ether | | t-Butyl n-decyl ether | |
|---|---|---|---|---|---|---|---|
| Mol Ratio | Eq Strip Pt | Mol Ratio | Eq Strip Pt | Mol Ratio | Eq Strip Pt | Mol Ratio | Eq Strip Pt |
| 0.47 | 2.2 | 0.53 | 2.2 | 0.69 | 2.2 | 0.45 | 2.2 |
| 0.54 | 2.1 | 0.70 | 2 | 0.79 | 2.1 | 0.57 | 2 |
| 0.62 | 2 | 0.80 | 1.9 | 0.90 | 2 | 0.70 | 1.8 |
| 0.79 | 1.8 | 0.91 | 1.8 | 1.11 | 1.8 | 0.85 | 1.6 |

The overall advantages of the branched ethers of the invention can best be illustrated by comparing the di-n-hexyl ether, t-butyl 2-ethylhexyl ether and t-butyl n-octyl ether, all three ethers having the same molecular weight, at an equilibrated strip point of 1.8 gpl Cu in the organic phase. t-Butyl n-octyl ether is a branched ether of the invention with branching on only one side of the ether functionality, while di-n-hexyl ether has no branching on either side of the ether functionality, and the t-butyl 2-ethyl hexyl ether has branching on both sides of the ether functionality, resulting in the t-butyl 2-ethyl hexyl ether having a high level of steric hindrance around the ether functionality. The di-n-hexyl ether and t-butyl 2-ethyl hexyl ether, neither one according to the instant invention, do act as modifiers, but the t-butyl n-octyl ether is clearly much more efficient in that job. As expected, with no branching on either side of the ether functionality in the di-n-hexyl ether, and as a result, the ether functionality being readily available to form hydrogen bonds with the oxime, 18% less of less sterically-hindered di-n-hexyl ether is required to achieve the same level of modification as the more hindered t-butyl 2-ethyl hexyl ether. To achieve an equilibrated strip point of 1.8 gpl Cu in the organic phase, you would need 1.11 moles of the t-butyl 2-ethylhexyl ether as opposed to 0.91 moles of di-n-hexyl ether per mole of the nonylsalicylaldoxime. Logic would then suggest that the t-butyl n-octyl ether, with branching on only one side of the ether functionality, and therefore, presumably an availability of the ether functionality, and an effectiveness as a modifier, to be between the other two compounds. However, the t-butyl n-octyl ether is shown to be a more efficient modifier, requiring only 0.67 moles of that ether to achieve an equilibrated strip point of 1.8 gpl Cu in the organic phase—26% less as compared with the less sterically-hindered di-n-hexyl ether.

These results show that, contrary to expectations, the extraction reagent formulations containing the branched-chain ethers of the present invention are more effective than extraction reagent formulations containing ethers with no branching on either side of the ether functionality or ethers with branching close to both sides of the ether functionality.

What is claimed is:

1. A water-immiscible extraction reagent formulation comprising an extractant reagent consisting of:
  (a) one or more aldoxime extractants,
  (b) optionally, one or more ketoxime extractants, and
  (c) one or more branched-chain ether equilibrium modifiers, in a molar ratio of branched-chain ether equilibrium modifier(s) to extractant reagent effective to provide a net copper transfer greater than that achieved in the absence of such modifier(s),
  wherein said branched-chain ether equilibrium modifiers are selected from the group consisting of compounds of Formula (I):

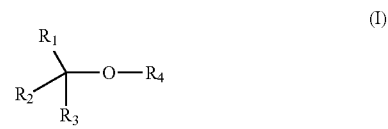

(I)

wherein $R_1$, $R_2$, and $R_3$, independently, represent a saturated or unsaturated, straight or branched $C_1$-$C_6$ alkyl group, hydrogen, a $C_5$-$C_6$ cycloalkyl group, or a phenyl group; and
  $R_4$ represents a saturated or unsaturated, straight-chain $C_1$-$C_{20}$ alkyl group,
  with the proviso that, if any one of $R_1$, $R_2$, or $R_3$ is hydrogen, then the other two must be the same $C_1$-$C_6$ alkyl group or each a different $C_1$-$C_6$ alkyl group, or one of the other two may be a $C_5$-$C_6$ cycloalkyl group or a phenyl group, and with the further proviso that the total number of carbon atoms in each branched-chain ether equilibrium modifier is 8-24.

2. The extraction reagent formulation according to claim 1, wherein $R_1$, $R_2$, and $R_3$ each represents a saturated $C_1$-$C_6$ alkyl group.

3. The extraction reagent formulation according to claim 1, wherein the molar ratio of said branched-chain ether equilibrium modifier(s) to said aldoxime extractant(s) is about 0.05 to about 1.5.

4. The extraction reagent formulation of claim 1, wherein the total number of carbon atoms of said branched-chain ether equilibrium modifier is 9-20.

5. The extraction reagent formulation of claim 1, wherein said aldoxime is an hydroxy aryl aldoxime of Formula (A):

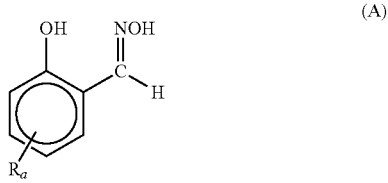

(A)

wherein "a" is 1, 2, 3 or 4, R is a saturated aliphatic group of 1 to about 25 carbon atoms or an ethylenically-unsaturated aliphatic group of about 3 to about 25 carbon atoms, and the total number of carbon atoms in $R_a$ is from 3 to about 25.

6. The extraction reagent formulation of claim 1, wherein said aldoxime extractant is selected from the group consisting of 2-hydroxy-5-heptylbenzaldoxime, 2-hydroxy-5-octylbenzaldoxime, 2-hydroxy-5-nonylbenzaldoxime and 2-hydroxy-5-dodecyl benzaldoxime.

7. The extraction reagent formulation of claim 1, wherein component (c) is selected from the group consisting of t-butyl n-octyl ether, t-butyl n-decyl ether and mixtures thereof.

* * * * *